Oct. 9, 1951 E. W. REYNOLDS 2,571,061

REEL SPINDLE

Filed May 16, 1947

INVENTOR
E. W. REYNOLDS
BY W. C. Parnell
ATTORNEY

Patented Oct. 9, 1951 2,571,061

UNITED STATES PATENT OFFICE 2,571,061

REEL SPINDLE

Ellwood W. Reynolds, Westfield, N. J., assignor to Western Electric Company, Incorporated, New York, N. Y., a corporation of New York Application May 16, 1947, Serial No. 748,465

3 Claims. (Cl. 242—156)

Figures 1, 2, 3:
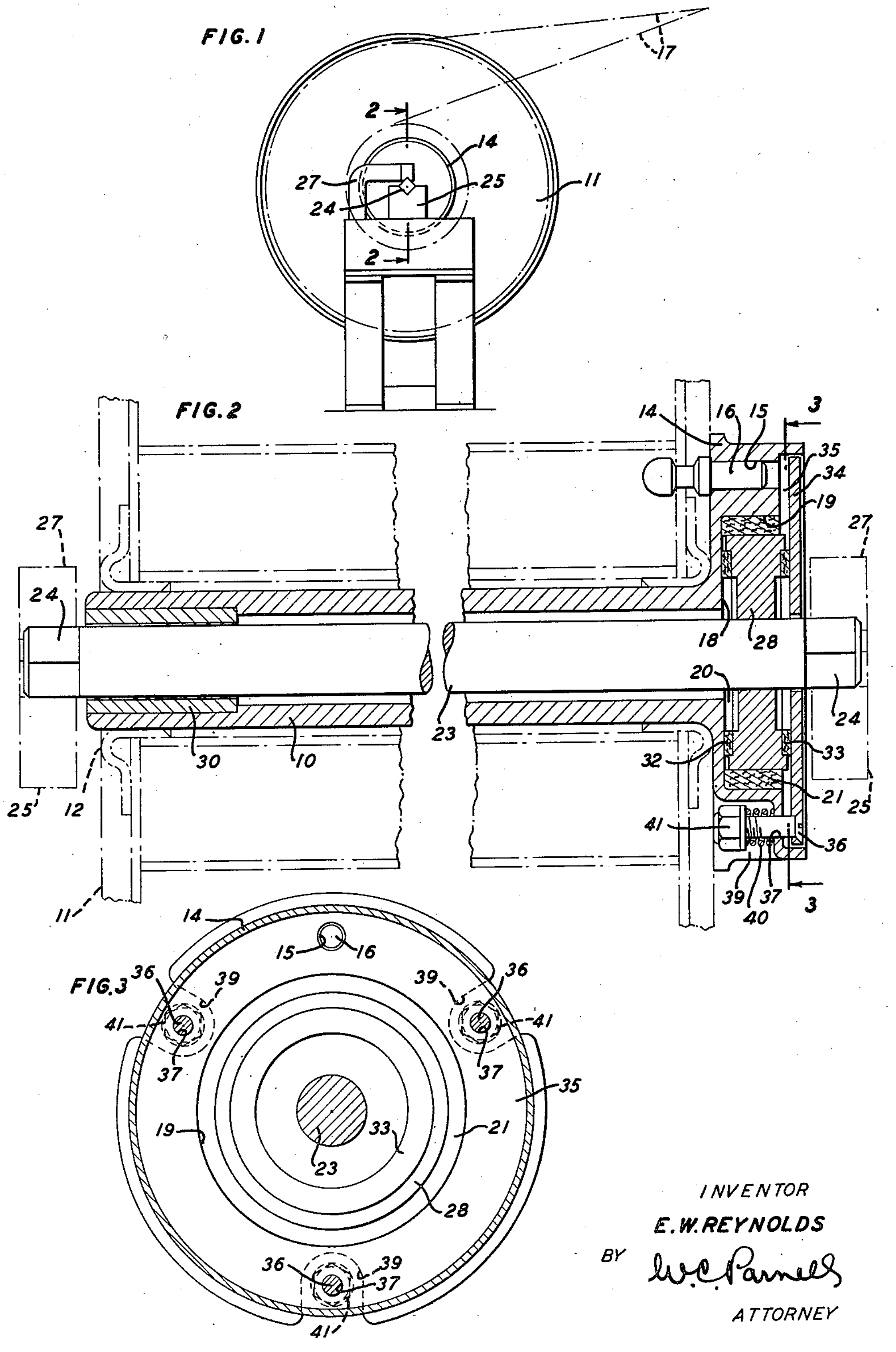

This invention relates to reel spindles and more particularly to a reel spindle for use in a supply reel to rotatably support the reel and apply a variable braking force thereto.

Reels are employed in numerous arts where strand, tape and sheet-like materials are manufactured. The present invention is of interest in the manufacture of electrical conductors and cables where the conductors, when insulated, are wound upon reels either singly or in pairs and these reels of electrical conductors are transported to machines generally described as stranders where the conductors are formed into various types of cables. When the reels serve as supply reels for the conductors, it has always been necessary to create a given tension in the material or conductors as they are withdrawn from the supply reels. The tensioning means heretofore employed for controlling the conductors withdrawn from the supply reels have been inherent in the stranders or the machines in which the reels are mounted.

An object of the invention is to provide a reel spindle which is simple in construction, readily mounted in a reel and highly efficient in creating a brake drag on the reel variable in force with variations in the amount of material on the reel to create a predetermined constant tension, which is selectively variable, in the material.

With this and other objects in view the invention comprises a spindle for a material supporting reel having a hub and rotatable about the axis of the hub by pull of the material from the reel, the spindle including a sleeve disposed in the hub of the reel to support the reel and rotate therewith, a drum fixed to the sleeve and secured to the reel to rotate therewith and a stationary brake element disposed in the drum to apply a given brake drag on the drum and through the sleeve to the reel to create a given tension in the material pulled from the reel.

More specifically, the spindle includes a stationary shaft positioned in the sleeve and having a friction element fixed to the shaft concentric with the inner periphery of the drum. An annular lining of friction material is disposed in the drum concentric with the element and fixed to the drum to rotate therewith whereby the weight of the reel will be applied to the friction element on the shaft through the friction material to create a brake drag of decreasing force comparable to the decreasing weight of the material on the reel and the decreasing lever arm between the point of takeoff of the material and the axis of the reel to create a constant tension in the material removed from the reel. The constant tension in the material removed from the reel may be varied by a pressure plate rotatable with the drum and urged toward the friction element under selectively variable pressures to engage a friction member carried by the element and to force a companion friction member also carried by the element to engage a surface of the drum.

Other objects and advantages will be apparent from the following detailed description when considered in conjunction with the accompanying drawing, wherein Fig. 1 is an end elevational view of a reel in which the spindle is mounted;

Fig. 2 is an enlarged fragmentary sectional view taken along the line 2—2 of Fig. 1; and Fig. 3 is a vertical sectional view of the spindle taken along the line 3—3 of Fig. 2.

Referring now to the drawing, the reel spindle includes a sleeve 10 which is of a given diameter depending upon the size of the reel 11 for which it is to be used. The sleeve 10 is receivable in a hub 12 of the reel 11 and has a drum 14 integral with one end of the sleeve provided with an aperture 15 to receive the conventional pin 16 which is made a part of the reel to connect the reel for rotation with any driving means when it functions as a takeup reel. The pin 16 in this instance forms a positive connection between the reel 11 and the sleeve 10 through its drum 14 to cause rotation thereof when the material or electrical conductors 17 are drawn from the reel. The drum 14 has a cavity 20 providing an inner wall 18 and an annular wall 19, the latter being concentric with the axes of the sleeve 10 and the reel 11. A brake lining 21 of a suitable material is disposed in the drum 14 and secured by suitable means (not shown) to the surface 19 of the drum.

A shaft 23 extends through the sleeve 10 and is provided with square ends 24 to be mounted in V-blocks 25 or other suitable supports which hold the shaft against rotation. In the present instance, movable arms 27 rest upon the square ends of the shaft to assist in holding the shaft against rotation.

A brake element 28, annular in general contour, is fixedly mounted upon the shaft 10 within the brake band 21 to support the adjacent end of the reel together with the drum 14 and the sleeve 10. A bearing 30 mounted in the sleeve 10 assists in supporting the sleeve and reel. Although there appears to be a snug fit between the shaft 23 and its bearing 30 there is sufficient clearance to allow a slight rocking movement of the sleeve, drum and reel whereby the major portion of the weight including the material 17 will rest on the brake element 28. An annular friction member 32 is fixed to the element 28 concentric with the shaft 23 and is positioned to engage the inner wall 18 of the drum 14. A like annular friction member 33 is fixedly mounted on the other side of the element 28 concentric with the shaft 23 and is positioned to be engaged by a pressure plate 34. The pressure plate 34 is positioned in a recessed portion 35 of the drum 14 and is supported by bolts 36 mounted for free movement in apertures 37 in the drum 14. By viewing Fig. 3, it will be noted that there are three of the bolts 36 partially housed in recesses 39 in the drum 14. Springs 40 positioned between adjacent walls of the drum and the nuts 41 of their respective bolts may be compressed to apply variable forces to the pressure plate 34 urging it to the left (Fig. 2) against its respective friction member 33 and to also urge the shaft 23 and the element 28 laterally to the left to force the friction member 32 against the surface 18.

During the pulling of the material 17, which in the present embodiment is composed of electrical conductors, the reel 11 will be rotated with the sleeve 10, the drum 14, the brake lining 21, and the pressure pad 34 relative to the stationary shaft 23 and its brake element 28, together with the friction members 32 and 33. When the reel is full of material, the maximum weight is applied to the element 28 through the brake band 21. At this time, however, the lever arm between the point of takeoff of the material and the axis of the reel, is of its maximum length requiring less force to pull the conductors or material to rotate the reel disregarding any frictional drag on the reel. To create a suitable constant tension in the material, a brake drag must be applied between the reel and its support. This is accomplished by the brake band 21 being forced against the periphery of the brake element 28, the force being comparable to the weight of the reel and the material thereon. As the material pays off the reel, this force decreases, decreasing the brake drag proportionately with the decrease in the lever arm to maintain a constant tension in the material being pulled off the reel. This constant tension is determined by the braking force initially embodied in the springs 40 and applied to the pressure pad 34 creating additional brake drags on the reel through the frictional contact of the pressure plate 34 with the friction member 33 and the surface 18 with the friction member 32. This braking force remains constant although it may be varied with variations in the sizes of wires withdrawn from the reel mounted on the spindle.

Although specific improvements of the invention have been shown and described, it will be understood that they are but illustrative and that various modifications may be made therein without departing from the scope and spirit of this invention as defined by the appended claims.

What is claimed is:

1. A spindle for a material supporting reel having a hub and rotatable about the substantially horizontal axis of the hub by the pull of material from the reel, the spindle comprising a shaft with its substantially horizontal axis substantially coincident with the axis of the hub, means to support the shaft adjacent the ends thereof and to hold the shaft against rotation, a brake element mounted concentric with the shaft adjacent one end thereof and held stationary thereby, a sleeve disposed in the hub of the reel to support the reel, a bearing member adjacent one end of the sleeve to support the said end of the sleeve for rotation with the reel on the shaft, a brake drum disposed concentric with the brake element supported thereby, fixed to the end of the sleeve opposite the bearing member and removably secured to the reel whereby the diminishing weight of the material on the reel, as the material is pulled therefrom, will create a diminishing brake drag between the brake element and brake drum with the decrease in the length of the lever arm at the point where the material pays off the reel to create a constant tension in the material.

2. A spindle for a material supporting reel having a hub and rotatable about the substantially horizontal axis of the hub by the pull of material from the reel, the spindle comprising a shaft with its substantially horizontal axis substantially coincident with the axis of the hub, means to support the shaft adjacent the ends thereof and to hold the shaft against rotation, a brake element mounted concentric with the shaft adjacent one end thereof and held stationary thereby, a sleeve disposed in the hub of the reel to support the reel, a bearing member adjacent one end of the sleeve to support the said end of the sleeve for rotation with the reel on the shaft, a brake drum disposed concentric with the brake element supported thereby, fixed to the end of the sleeve opposite the bearing member and removably secured to the reel whereby the diminishing weight of the material on the reel, as the material is pulled therefrom, will create a diminishing brake drag between the brake element and brake drum with the decrease in the length of the lever arm at the point where the material pays off the reel to create a constant tension in the material, and a mechanism supported by the brake drum and actuable to vary the constant tension in the material selectively.

3. A spindle for a material supporting reel having a hub and rotatable about the substantially horizontal axis of the hub by the pull of material from the reel, the spindle comprising a shaft with its substantially horizontal axis substantially coincident with the axis of the hub, means to support the shaft adjacent the ends thereof and to hold the shaft against rotation, a brake element mounted concentric with the shaft adjacent one end thereof and held stationary thereby, a sleeve disposed in the hub of the reel to support the reel, a bearing member adjacent one end of the sleeve to support the said end of the sleeve for rotation with the reel on the shaft, a brake drum disposed concentric with the brake element supported thereby, fixed to the end of the sleeve opposite the bearing member and removably secured to the reel whereby the diminishing weight of the material on the reel, as the material is pulled therefrom, will create a diminishing brake drag between the brake element and brake drum with the decrease in the length of the lever arm at the point where the material pays off the reel to create a constant tension in the material, a pressure plate positioned to engage the brake element, and a mechanism actuable to cause the pressure plate to rotate with the drum and apply a variable force to the pressure plate forcing it against the brake element to vary the constant tension in the material.

ELLWOOD W. REYNOLDS.

REFERENCES CITED

The following references are of record in the file of this patent:

UNITED STATES PATENTS

| Number | Name | Date |
|---|---|---|
| 1,377,112 | Boylan | May 3, 1921 |
| 1,399,988 | Pierce | Dec. 13, 1921 |
| 1,798,904 | Schneider | Mar. 31, 1931 |
| 1,850,755 | Kindelmann et al. | Mar. 22, 1932 |
| 1,854,928 | Frappier et al. | Apr. 19, 1932 |
| 1,861,562 | Bovget et al. | June 7, 1932 |
| 2,417,941 | Loos | Mar. 25, 1947 |